United States Patent [19]

Laird

[11] Patent Number: 5,559,832
[45] Date of Patent: Sep. 24, 1996

[54] METHOD AND APPARATUS FOR MAINTAINING CONVERGENCE WITHIN AN ADPCM COMMUNICATION SYSTEM DURING DISCONTINUOUS TRANSMISSION

[75] Inventor: Kevin M. Laird, Haltom City, Tex.

[73] Assignee: Motorola, Inc., Schaumburg, Ill.

[21] Appl. No.: 405,452

[22] Filed: Mar. 16, 1995

Related U.S. Application Data

[63] Continuation of Ser. No. 82,632, Jun. 28, 1993, abandoned.

[51] Int. Cl.⁶ .................................................. H04R 14/06
[52] U.S. Cl. ........................ 375/244; 375/259; 341/143
[58] Field of Search .......................... 375/244, 241–242, 375/259; 370/7; 341/143; 348/410; 381/29

[56] References Cited

U.S. PATENT DOCUMENTS

| | | | |
|---|---|---|---|
| 4,142,066 | 2/1979 | Ahamed | 381/47 |
| 4,672,669 | 6/1987 | DesBlache et al. | 381/46 |
| 4,774,496 | 9/1988 | Tomasevich | 341/50 |
| 4,864,561 | 9/1989 | Ashenfelter et al. | 370/81 |

OTHER PUBLICATIONS

*The 32-kb/s ADPCM Coding Standard;* Nevio Benvenuto, Guido Bertocci, and William R. Daumer; AT&T Technical Journal, vol. 65, Issue 5, Sep./Oct. 1986.

Primary Examiner—Young T. Tse
Attorney, Agent, or Firm—Raymond J. Warren

[57] ABSTRACT

An information gap in an ADPCM signal is detected in one or both of a transmitter or receiver. This detection can be accomplished using a voice activity detector. When an information gap is detected, a clock signal to the encoder and/or decoder is interrupted. Alternatively, null frames can be inserted into the encoder and/or decoder. When null frames are used, it is preferable to insert comfort noise into the signal output from the decoder.

13 Claims, 2 Drawing Sheets

5,559,832

METHOD AND APPARATUS FOR MAINTAINING CONVERGENCE WITHIN AN ADPCM COMMUNICATION SYSTEM DURING DISCONTINUOUS TRANSMISSION

This is a continuation of application Ser. No. 08/082,632, filed Jun. 28, 1993 and now abandoned.

FIELD OF THE INVENTION

The field of the invention relates to communication systems and in particular to digital communication systems.

BACKGROUND OF THE INVENTION

Digital speech coding in a telecommunications environment using adaptive differential pulse code modulation (ADPCM) is known. ADPCM is a data compression/decompression routine used to exchange voice or data between a high speed data link (e.g., a T1 span line) and a lower capacity data link (e.g., an air interface between a cellular radiotelephone and a cellular base station).

ADPCM has been standardized by the International Telegraph and Telephone Consultative Committee (CCITT) under CCITT Recommendation G.721 for digital speech coding in a telecommunications environment. The standard, as defined by the CCITT, specifies the translation of µ-law or A-law pulse code modulated (PCM) encoded speech at 64 kbit/s to ADPCM encoded speech at 32 kbit/s to provide a 2 to 1 compression of the speech signal with very little perceptual loss of speech quality.

ADPCM encoders and decoders take advantage of a tendency of speech signals to vary slowly over time to provide an adaptive step size and compression factor. An ADPCM encoder uses only a coded ADPCM signal for feedback to a prediction and adaptation section. The ADPCM decoder also uses the encoded ADPCM signal for prediction and adaptation. The use of the same feedback parameter results in no need for the transmission of update parameters over the communication channel between encoder and decoder. The use of the same parameter for prediction and adaptation provides two key benefits: 1) the encoder and decoder are almost identical in function, and 2) the encoder and decoder will (in the absence of transmission errors) always converge to the same state with identical internal values.

In order that an ADPCM encoder and decoder be maintained in an identical state (i.e., maintained in convergence), the prior art has taught that a communication channel, once established under ADPCM, must be maintained for the duration of a communication transaction. The prior art has taught that interruption of the communication channel results in divergence of encoder and decoder. At the end of the interruption the encoder and decoder would have to re-converge, which would result in speech interruptions.

Maintaining a channel during speech pauses (or maintaining a second half of a duplex channel while one party is listening) is inefficient in that at least power is unnecessarily consumed. Because of the importance of communications, a need exists for a means of interrupting ADPCM transmissions during normal conversation without losing convergence of encoder and decoder.

SUMMARY OF THE INVENTION

An apparatus and method of maintaining convergence of an encoder and decoder of an adaptive differential pulse code modulated (ADPCM) communication system during discontinuous transmission is provided. The method Includes the steps of detecting an information gap in an ADPCM signal and controlling encoder and decoder adaptation during the information gap. The apparatus provides a means for implementing the described method.

DETAILED DESCRIPTION OF THE PREFERRED EMBODIMENT

The solution to the problem of maintaining convergence of encoder and decoder of ADPCM communication systems lies, conceptually, in detecting speech gaps and, as a consequence, controlling adaptation at known states. Adaptation may be controlled within the encoder and decoder by interrupting clock pulses to the encoder and decoder. The advent of a speech gap is detected at a transmitter through operation of a voice activity detector (VAD). An output of the VAD is used to interrupt clock pulses to the ADPCM encoder. Interruption of the clock to the encoder results in an interruption of frame transmission from the transmitter.

The absence of frame transmission is detected at a receiver by a frame quality detector (FQD). The FQD, in turn, interrupts clock pulses to the ADPCM decoder.

At the end of the speech gap the VAD enables clock pulses to the ADPCM encoder. Enabling the encoder causes encoded frames to again be transmitted. Transmission of encoded frames is detected at the receiver by the FQD. Detection of encoded frames by the FQD causes the FQD to again enable clock pulses to the decoder.

Figure 5:
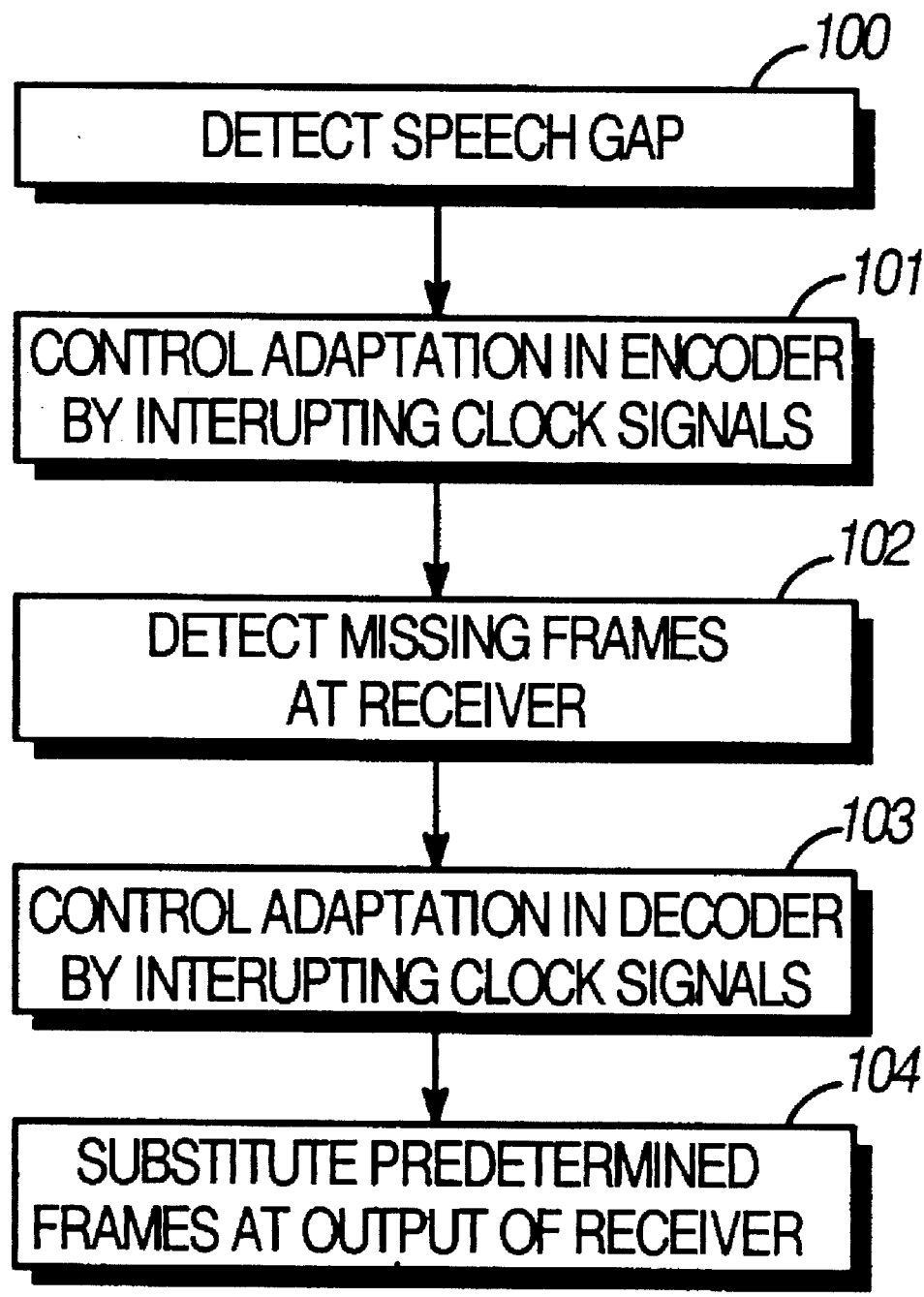
FIG. 5 is a flow chart depicting adaptation control under an embodiment of the invention.

FIG. 5 is a flow chart of adaptation control in the encoder and decoder. Reference will be made to the flow chart as appropriate to understanding the invention.

Figure 1:
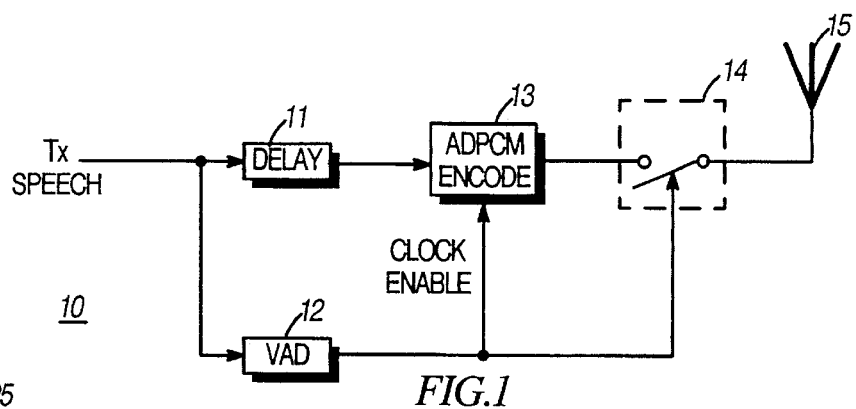
FIG. 1 is a block diagram of a ADPCM encoder in accordance with an embodiment of the invention.

FIG. 1 is an ADPCM transmitter 10 (e.g., located in a cellular base site) in accordance with an embodiment of the invention. Speech for transmission (TX Speech) is received as PCM blocks from a speech source (e.g., a T1 span line) and converted 13 after a delay 11 from 64 kbit/s to 32 kbit/s for transmission from an antenna 15. The VAD 12 detects speech gaps 100 by comparison of the speech blocks with a threshold.

Periodically, using a prescribed method known to the receiver, the ADPCM coder is allowed to operate during a speech gap so that a sampling of the background noise at the transmitter microphone (not shown) can be sent to the receiver to be used to fill speech gaps in the received speech. These frames are known as noise frames. The receiver can detect which frames are noise frames by the pattern of transmitted/non-transmitted frames. For example, during a speech gap, every 16th frame could be transmitted. The receiver, seeing a 15 frame space followed by a transmitted frame followed by a missing frame, knows that the one received frame is a noise frame and that this frame is to be placed in the noise pool.

Figure 2:
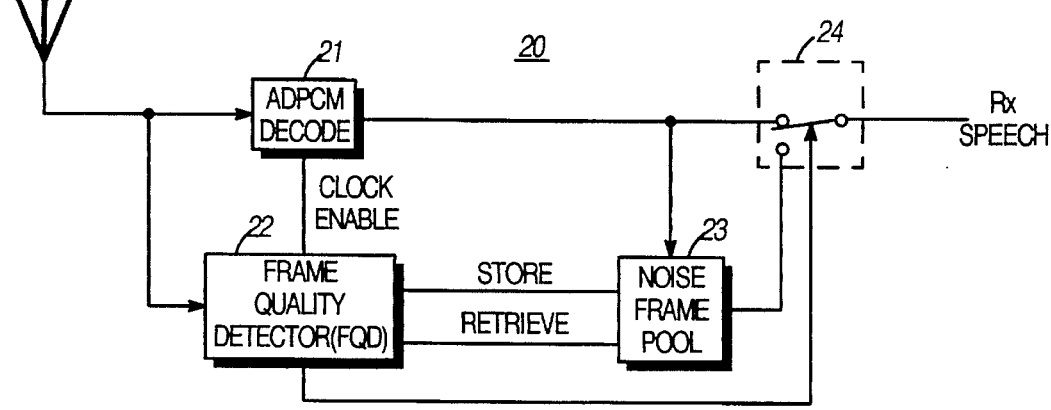
FIG. 2 is a block diagram of an ADPCM decoder in accordance with an embodiment of the invention.

FIG. 2 is a receiver 20 (e.g., located in a cellular radiotelephone) in accordance with one embodiment of the invention. Speech transmitted at 32 kbit/s from the transmitting antenna 15 is received by a receiving antenna 25 for decoding within the ADPCM decoder 21. Decoded speech (RX speech) may then be converted within a digital-to-analog (D/A) converter (not shown) for application to an audio speaker (not shown).

Also included within the receiver 20 is a FQD 22. The FRQ 22 compares received frames with a second and a third threshold for noise or absent frames. Where a noise frame is detected (the received frame does not exceed the second threshold) a STORE output of FQD 22 is activated storing the noise frame in a memory 23 (noise frame pool). Where an absent frame is detected 102 (the received frame does not exceed the third threshold) the FQD 22 interrupts adaptation 103 the ADPCM decoder 21 (by disabling a CLOCK ENABLE) and substitutes a predetermined frame (noise frame) from the noise frame pool 23 into the RX speech. The FQD substitutes the noise frame by activating a RETRIEVE input to the noise frame pool 23 causing the noise frame pool 23 to output a single, previously stored, noise frame. Concurrently the FQD 22 activates the switch 24 for insertion of the noise frame into the RX speech information stream.

When the VAD 12 of the transmitter 10 detects the advent of a speech gap (the speech block does not exceed the threshold), the VAD 12 disables the CLOCK ENABLE to the ADPCM encoder 13 and opens a switch 14 to an antenna 15 for that frame. The FQD 22, at the receiver 20 upon detecting the absent frame, in response substitutes a noise frame 104 from the noise frame pool 23.

Disabling the ADPCM encoder and decoder for a particular speech frame beneficially allows the ADPCM encoder and decoder to remain in a converged state without transmission of a useless frame. Such omission of useless frames reduces interference by reducing transmitted radio frequency energy and conserves battery life of portables. At the end of the speech gap the transmitter 10 and receiver 20 resume normal operation.

Figure 3:
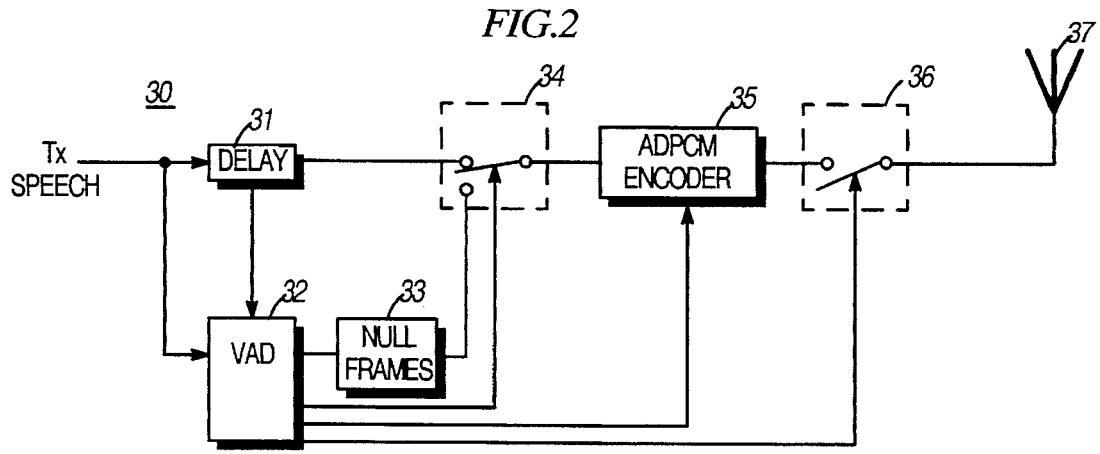
FIG. 3 is a block diagram of a ADPCM encoder in accordance with an alternate embodiment of the invention.

In another embodiment of the invention null frames are used to drive the ADPCM encoder and decoder to identical states by insertion of null frames. In FIG. 3, a VAD 32 detects the advent of a speech gap and causes switches 34 and 36 to transfer position. Switch 34 causes a null frame to substituted for the frame of the speech gap into the ADPCM encoder 35. The second switch 36 causes transmission of the frame to be interrupted.

Figure 4:
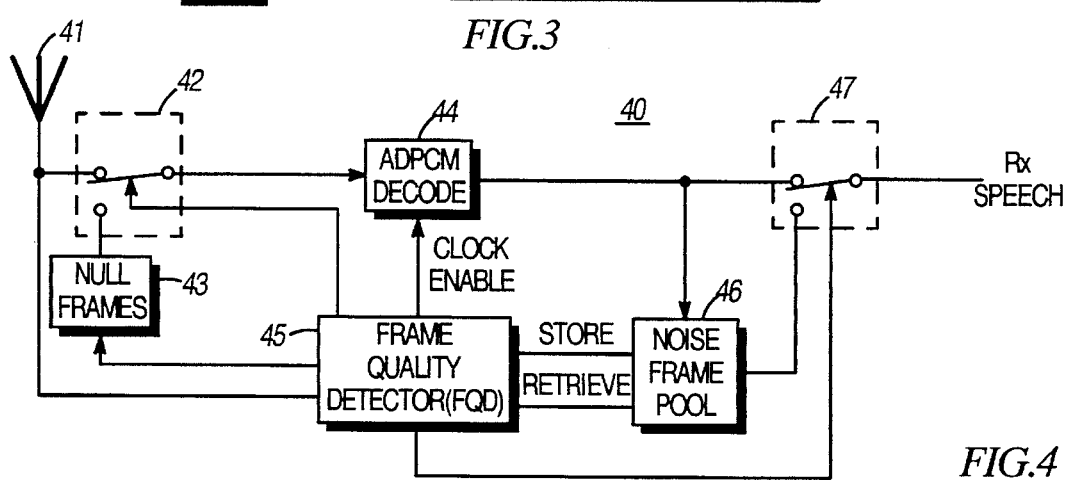
FIG. 4 is a block diagram of an ADPCM decoder in accordance with an alternate embodiment of the invention.

At a receiver 40 (FIG. 4), the missing frame is detected by the FQD 45 causing switches 42 and 47 to transfer position. Transfer of switch 42 causes a null frame to be inserted into the ADPCM decoder 44 and transfer of switch 47 causes a previously stored noise frame to be inserted into the RX speech information stream.

Since the transmitter 30 and receiver 40 insert an identical number of null frames into the ADPCM encoder 35 and decoder 44, the encoder 35 and decoder 44 remain in identical states. The use of null frames allow for the omission of single frames of groups of frames to be omitted without affecting convergence of the transmitter 30 and receiver 40 of the communication system.

The invention claimed is:

1. A method of maintaining convergence of an encoder and decoder of an adaptive differential pulse code modulated (ADPCM) communication system during discontinuous transmission, said method comprising the steps of: detecting, at a transmitter having a voice activity detector (VAD), an information gap in a signal to be transmitted; controlling, at the transmitter, an encoder adaptation during the information gap by interrupting a clock of the encoder, the interruption being based, in part, upon an output from the VAD; transmitting an ADPCM signal, having the interruption, from said transmitter; and controlling a decoder adaptation upon receipt of the interruption of the ADPCM signal at a receiver.

2. A method of maintaining convergence of an encoder and decoder of an adaptive differential pulse code modulated (ADPCM) communication system during discontinuous transmission, said method comprising the steps of: detecting, at a transmitter, an information gap in a signal to be transmitted; controlling an encoder adaptation during the information gap; suspending transmission of an ADPCM signal during the information gap; detecting the suspension of transmission in the ADPCM signal at a receiver; controlling a decoder adaptation at the receiver when the suspension of transmission in the ADPCM signal is detected; generating a decoded signal from the decoder; and inserting comfort noise frames into the decoded signal when the suspension of transmission is detected.

3. The method as in claim 2 wherein the step of detecting the information gap utilizes a voice activity detector (VAD).

4. The method as in claim 3 wherein the step of controlling the encoder adaptation during the information gap comprises the step of interrupting a clock signal to the encoder based, in part, upon an output from the VAD.

5. The method as in claim 2 wherein the step of controlling the decoder adaptation during the suspension of transmission comprises the step of interrupting a clock signal to the decoder.

6. The method as in claim 2 wherein the steps of controlling the encoder and decoder adaptations each comprises the step of inserting null frames into their respective encoder or decoder during the information gap.

7. An apparatus for maintaining convergence of an encoder and decoder of a cellular adaptive differential pulse code modulated (ADPCM) communication system during discontinuous transmission, said apparatus comprising: means for detecting using a voice activity detector (VAD), in a transmitter, an information gap in a signal to be transmitted; means for controlling an encoder adaptation of the encoder during the information gap by interrupting a clock of the encoder, the interruption being based, in part, upon an output from the VAD; means for generating an ADPCM signal from the transmitter having an interruption; and means for maintaining convergence by controlling a decoder adaptation of the decoder at a receiver during the detection of an interruption in a received ADPCM signal.

8. The apparatus as in claim 7 further comprising means, in said transmitter, for suspending transmission of ADPCM signals during the information gap.

9. A method of maintaining convergence of an encoder and decoder of an adaptive differential pulse code modulated (ADPCM) communication system during discontinuous transmission, said method comprising the steps of: detecting, at a transmitter, an information gap in a signal to be transmitted; suspending transmission of an ADPCM signal during the information gap; controlling an encoder adaptation of the encoder during the information gap to insert a null frame in the ADPCM signal being transmitted; detecting the null frame at a receiver; and controlling a decoder adaptation of the decoder, to maintain convergence, when the null frame is detected.

10. A method of maintaining convergence of an encoder and decoder of an adaptive differential pulse code modulated (ADPCM) communication system during discontinuous transmission, said method comprising the steps of: detecting, using a voice activity detector (VAD) at a transmitter, an information gap in a signal to be transmitted; controlling an encoder adaptation of the encoder during the information gap by interrupting a clock signal to the encoder based, in part, upon an output from the VAD; and controlling a decoder adaptation by interrupting a clock of the decoder, the interruption being based, in part, upon an output from a quality detector, said output from said quality detector being generated upon receipt of an interruption in a signal generated by the encoder.

11. The method as in claim 10 further comprising the step of substituting predetermined frames from a memory into a signal generated by the decoder upon receipt of the interruption in the signal.

12. A method of maintaining convergence of an encoder and decoder of an adaptive differential pulse code modulated (ADPCM) communication system during discontinuous transmission, said method comprising the steps of: detecting, at a transmitter, an information gap in a signal to be transmitted; controlling an encoder adaptation of the encoder during the information gap by inserting a null frame into the encoder; detecting, at a receiver, the null frame in a received ADPCM signal; and controlling a decoder adaptation of the decoder, at the receiver, during the null frame by inserting a noise frame signal into a signal generated by the decoder.

13. An apparatus for maintaining convergence of an encoder and decoder of a base site of a cellular adaptive differential pulse code modulated (ADPCM) communication system during discontinuous transmission, said apparatus comprising: means for detecting using a voice activity detector (VAD), in a transmitter, an information gap in a signal to be transmitted; means for controlling an encoder adaptation during the information gap by inserting a null frame into the encoder; means for detecting using a quality detector, in a receiver, the null frame in an ADPCM signal; and means for controlling a decoder adaptation during the null frame by inserting null frames into the decoder.

* * * * *